H. BAGLEY.
Corn-Planter.
No. 211,370.    Patented Jan. 14, 1879.
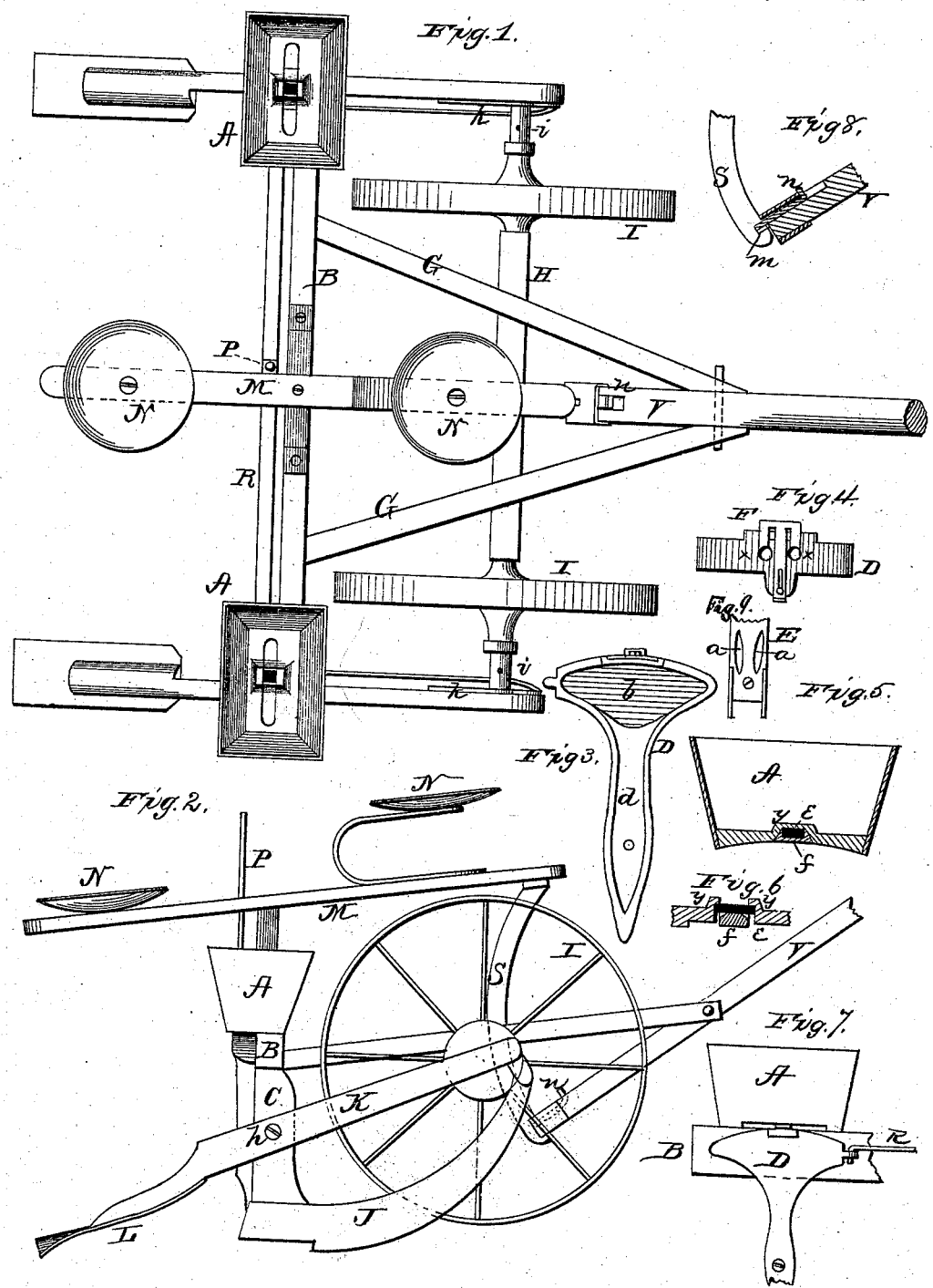

UNITED STATES PATENT OFFICE.

HENRY BAGLEY, OF MECHANICSVILLE, IOWA.

IMPROVEMENT IN CORN-PLANTERS.

Specification forming part of Letters Patent No. 211,370, dated January 14, 1879; application filed November 18, 1878.

*To all whom it may concern:*

Be it known that I, HENRY BAGLEY, of Mechanicsville, in the county of Cedar, and in the State of Iowa, have invented certain new and useful Improvements in Corn-Planters; and do hereby declare that the following is a full, clear, and exact description thereof, reference being had to the accompanying drawings, and to the letters of reference marked thereon, making a part of this specification.

The nature of my invention consists in the construction and arrangement of a corn-planter, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 is a side elevation, of my corn-planter. Figs. 3, 4, 5, 6, 7, 8, and 9 are detailed views of parts thereof.

A A represent the corn-boxes, attached to the ends of a connecting-bar, B, from which the arms C C depend, each arm being, on its rear side, provided with a metal plate, E, having near the lower end two channels, $a\,a$. To the plate E is pivoted the oscillating drop D, having its upper end made in segmental form, as shown in Figs. 3 and 7. In this part of the drop are two seed-openings, $x\,x$, through which the corn passes into a chamber, $b$, on the inner side of the drop, and from this chamber downward through a channel, $d$, which latter communicates with either one or the other of the channels $a$ in the plate E as the drop is oscillated, so as to allow the corn to fall down into the furrow.

The seed-openings $x\,x$ in the drop are regulated as to size by means of a T-shaped slide, F, (shown in Fig. 4,) so as to regulate the amount of corn dropped at each stroke.

In the bottom of each corn-box is a longitudinal slot, under which the drop works, and in the center of this slot is a valve or cut-off, $f$, across the top of which, in a recess in the valve, is placed a rubber bar, $e$, and this rubber bar is held under lips $y$, formed in the bottom.

The bar B is, by hounds G G, connected with the axle H, which has a wheel, I, on each end; but the axle projects a suitable distance beyond each wheel, as shown.

J represents the runner, having its rear end secured to the arm C, and its forward end is pivoted to the coverer-beam K, or rather the said beam is pivoted to the forward end of the runner. This beam is fastened to the arm C by a screw or bolt, $h$, the whole thus forming a frame, which is attached to the main frame by a flexible joint composed of a socket, $i$, projecting from a plate, $k$, fastened to the beam K, and the socket or sleeve placed over the end of the axle.

To the rear end of the beam K is attached the coverer L, formed of a single steel plate, made concave or flat on the under side, as desired. This plate is so set and elevated that the principal part of the weight rests on the rear end.

The depth of the planter is regulated by raising and lowering the beam K on the arm or shank C, by tightening the screw $h$ at any point desired.

Above the machine thus constructed is an elevated beam, M, on which the seats N N are supported, the front seat being for the driver and the rear one for the dropper, who operates the drops D D simultaneously by means of a lever, P, and bar R, connecting the drops. From the front end of the seat-beam M depends a curved bar, S, having a notch, $m$, formed in its lower end. V is the tongue, pivoted between the forward ends of the hounds G G. The tongue has a slot at its rear end, to fit over the bar S, and a sliding latch, $n$, to enter the notch $m$ and hold the tongue rigid—or, in other words, making a stiff tongue when necessary.

By releasing the latch it becomes a flexible tongue, which enables the driver to raise and lower the machine with ease by placing the foot upon the rear end of the tongue. By pressing downward, the rear part of the machine is raised upward and thrown upon the wheels. This also throws the driver forward without leaving the seat, in which position he can conveniently hold the machine while turning around, without the use of the lock or latch $n$.

Having thus fully described my invention, what I claim as new, and desire to secure by Letters Patent, is—

1. The combination of the arm or shank C, runner J, adjustable beam K, with coverer L, and the joint $k\ i$, to form a flexible connection with the end of the axle, substantially as herein set forth.

2. The oscillating drop D, provided with seed-openings $x$, slide F, chamber $b$, and channel $d$, in combination with the plate E, having channels $a\ a$, substantially as and for the purposes herein set forth.

3. The combination of the corn-box A, having its bottom formed with the seat $y$, the rubber bar $e$, and the flanged metallic cut-off $f$, all constructed substantially as and for the purposes herein set forth.

In testimony that I claim the foregoing I have hereunto set my hand this 8th day of November, 1878.

HENRY BAGLEY.

Witnesses:
J. S. GORTNER,
WILLIAM HOLMES.